F. SCHMIDT & A. GRUNDMANN.
FLEXIBLE SHAFT.
APPLICATION FILED JUNE 10, 1909.
969,660.
Patented Sept. 6, 1910.
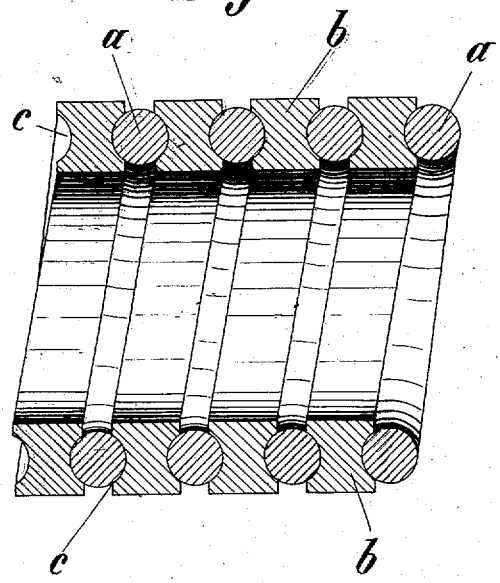
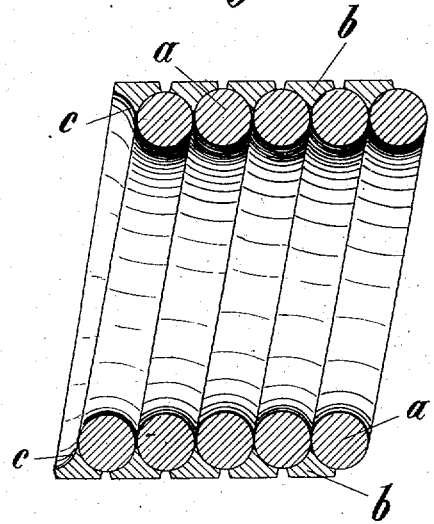
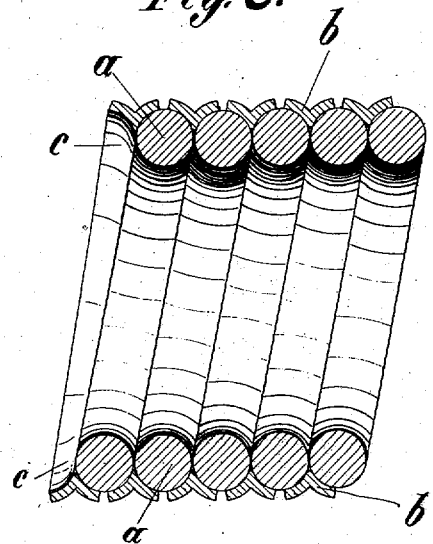

UNITED STATES PATENT OFFICE.

FRANZ SCHMIDT AND ALBERT GRUNDMANN, OF BERLIN, GERMANY.

FLEXIBLE SHAFT.

969,660.  Specification of Letters Patent.  Patented Sept. 6, 1910.

Application filed June 10, 1909. Serial No. 501,360.

*To all whom it may concern:*

Be it known that we, FRANZ SCHMIDT and ALBERT GRUNDMANN, subjects of the German Emperor, and residing at Berlin, Germany, have invented certain new and useful Improvements in Flexible Shafts, of which the following is a specification.

Our invention relates to flexible hollow shafts, and a primary object is to provide a flexible shaft which is lighter and cheaper to manufacture than those known heretofore.

Flexible shafts are already well-known which consist of spiral wires of various cross-section, e. g., round and square, wound beside and over one another alternately, whereby it is intended to prevent the individual wires sliding out of place. In these and similar flexible shafts, however, a plurality of concentric layers of turns or convolutions contacting one another are necessary in order to prevent the individual turns coming apart when the shaft bends, since the opened parts are no longer subjected to tension but to a bending strain, so that the shaft can easily be deformed or destroyed. In consequence of the layers of convolutions filling up the entire cross-section of the shaft such shafts are also very heavy and expensive. As compared with these known shafts, the flexible shaft forming the subject-matter of our invention is distinguished by the inner turns of wire which filled up the cross-section of the shaft being superfluous, since the one or more spirals forming the shaft support themselves by means of their turns or convolutions against concave or wedge-like faces arranged continuously in the plane of the turns, so that the turns of wire cannot move out of the plane of the turns. The shafts made according to our invention are therefore considerably lighter and cost considerably less to make than known flexible shafts, and the individual turns of wire are perfectly secured from jumping out of place even when the shaft is bent sharply and transmits somewhat great forces.

A further advantage attached to our improved shaft is that it is hollow and consequently, besides transmitting power, can serve simultaneously for supplying air, liquids or lubricants which is very advantageous, for example, when driving rock and metal drills or when driving polishing disks in works for polishing marble, agate or glass, as special conduits were necessary for this purpose heretofore.

In order that our invention may be clearly understood we will now explain the same with reference to the accompanying drawing in which several constructional forms are represented by way of example.

In said drawing:—Figure 1 is a vertical longitudinal section through one form of our improved flexible shaft, and Figs. 2 and 3 are like views of two other forms in which the turns of the spiral are held by exterior spiral bodies.

Referring to the drawing, the faces $c$ which prevent the wire spirals $a$ moving out of the plane of the turns or convolutions of the spiral may be arranged in turns $b$ of a special spiral, as clearly shown in the forms represented in Figs. 1, 2 and 3. As Fig. 1 shows, the faces $c$ may contact with the turns $a$ both outside and inside the shaft, or only outside the same as shown in Figs. 2 and 3. In all cases the arrangement of these spiral bodies $b$ of wedge-like cross-section or having concave surfaces $c$ against which the turns of wire $a$ of the flexible shaft abut prevents the turns $a$ which are supported articularly, as it were, being pressed out of the plane of the turns of the shaft without the entire cross-section of the shaft requiring to be filled up with convolutions of wire, whereby the shafts become more flexible, lighter and cheaper and simultaneously can also be used for conducting liquids or air.

We claim:

1. A flexible hollow shaft, comprising in combination a spirally coiled wire of circular cross-section, and a spirally coiled body having concave lateral faces abutting against each turn or convolution of said wire.

2. A flexible hollow shaft, comprising in combination a spirally coiled wire of circular cross-section, and a spirally coiled body having concave lateral faces between the turns or convolutions of said wire and abutting against the outside and the inside of each turn or convolution of the wire, as set forth.

3. A flexible hollow shaft comprising in combination a spirally coiled wire of circular cross-section, and a spirally coiled body having concave lateral faces between the turns or convolutions of said wire and abutting against the outside of each turn or convolution of the wire, as set forth.

4. In a flexible hollow shaft comprising in combination a spirally coiled wire of circular cross-section, and a spirally coiled wire having two concave lateral faces receiving the adjacent sides of the wire of circular cross-section, substantially as shown, and for the purpose specified.

In testimony whereof, we affix our signatures in the presence of two witnesses.

FRANZ SCHMIDT.
ALBERT GRUNDMANN.

Witnesses:
WOLDEMAR HAUPT,
HENRY HASPER.

Disclaimer in Letters Patent No. 969,660.

DISCLAIMER.

969,660.—*Franz Schmidt* and *Albert Grundmann*, Berlin, Germany. FLEXIBLE SHAFT. Patent dated September 6, 1910. Disclaimer filed September 26, 1912, by the assignee, *Charles Fischer*.

Hereby disclaims—

The subject-matter of claims 1 and 3, except where the abutting surfaces of the two wires meet and rest against each other for a considerable area, and the radius of curves of the two abutting surfaces are of substantially the same radius.

Also the subject-matter of claim 4, except where the two concave lateral surfaces are of substantially the same radius.

[*Official Gazette, October 1, 1912.*]

cross-section, and a spirally coiled body having concave lateral faces between the turns or convolutions of said wire and abutting against the outside of each turn or convolution of the wire, as set forth.

4. In a flexible hollow shaft comprising in combination a spirally coiled wire of circular cross-section, and a spirally coiled wire having two concave lateral faces receiving the adjacent sides of the wire of circular cross-section, substantially as shown, and for the purpose specified.

In testimony whereof, we affix our signatures in the presence of two witnesses.

FRANZ SCHMIDT.
ALBERT GRUNDMANN.

Witnesses:
WOLDEMAR HAUPT,
HENRY HASPER.

DISCLAIMER.

969,660.—*Franz Schmidt* and *Albert Grundmann*, Berlin, Germany. FLEXIBLE SHAFT. Patent dated September 6, 1910. Disclaimer filed September 26, 1912, by the assignee, *Charles Fischer*.

Hereby disclaims—

The subject-matter of claims 1 and 3, except where the abutting surfaces of the two wires meet and rest against each other for a considerable area, and the radius of curves of the two abutting surfaces are of substantially the same radius.

Also the subject-matter of claim 4, except where the two concave lateral surfaces are of substantially the same radius.

[*Official Gazette, October 1, 1912.*]

DISCLAIMER.

969,660.—*Franz Schmidt* and *Albert Grundmann*, Berlin, Germany. FLEXIBLE SHAFT. Patent dated September 6, 1910. Disclaimer filed September 26, 1912, by the assignee, *Charles Fischer*.

Hereby disclaims—

The subject-matter of claims 1 and 3, except where the abutting surfaces of the two wires meet and rest against each other for a considerable area, and the radius of curves of the two abutting surfaces are of substantially the same radius.

Also the subject-matter of claim 4, except where the two concave lateral surfaces are of substantially the same radius.

[*Official Gazette, October 1, 1912.*]